United States Patent [19]

Hallerbäck

[11] Patent Number: 4,565,493

[45] Date of Patent: Jan. 21, 1986

[54] HUB FOR FANS, WHEELS AND THE LIKE

[75] Inventor: Stig L. Hallerbäck, Västra Frölunda, Sweden

[73] Assignee: Aktiebolaget SKF, Gothenburg, Sweden

[21] Appl. No.: 643,046

[22] Filed: Aug. 22, 1984

Related U.S. Application Data

[63] Continuation of Ser. No. 477,088, Mar. 21, 1983, abandoned.

[30] Foreign Application Priority Data

Mar. 31, 1982 [SE] Sweden .................................. 8202045

[51] Int. Cl.[4] .......................... F04D 29/60; F16D 1/06
[52] U.S. Cl. ............................ 416/204 R; 416/244 R; 403/41; 403/229
[58] Field of Search ............... 416/229 R, 230, 244 R, 416/229 A, 244 A, 241 A; 403/41, 228, 229; 285/114; 339/104

[56] References Cited

U.S. PATENT DOCUMENTS

| 2,418,418 | 4/1947 | Martin et al. | 403/229 X |
| 3,136,370 | 6/1964 | Carlson | 416/241 B |
| 3,233,678 | 2/1966 | Wilk | 416/241 A |
| 3,244,236 | 4/1966 | Langham | 416/244 B |
| 3,666,302 | 5/1972 | Kellett | 416/244 A X |
| 3,918,838 | 11/1975 | Moody, Jr. et al. | 416/241 A X |
| 4,076,456 | 2/1978 | Tree et al. | 416/244 A X |
| 4,227,424 | 10/1980 | Schleappe | 403/229 X |

FOREIGN PATENT DOCUMENTS

| 702039 | 1/1941 | Fed. Rep. of Germany | 416/241 A |
| 781396 | 11/1980 | U.S.S.R. | 416/244 A |

Primary Examiner—Robert E. Garrett
Assistant Examiner—Joseph M. Pitko
Attorney, Agent, or Firm—Eugene E. Renz, Jr

[57] ABSTRACT

The invention refers to a hub for fans, wheels or the like, mainly consisting of a cast compound such as plastic. Adjacent the bore (3) of the hub there is embedded a reinforcing coil (4) preferably of steel. This coil is so strong that it at temperature variations will urge the cast compound to follow the thermal dimension variations of the coil (4).

5 Claims, 4 Drawing Figures

whereupon the mandrel with the coil fitted thereon is embedded in cast compound. For ascertaining that the coil shall be located inside the surface of the bore, the mandrel is provided with longitudinal ridges, which prevent the coil from direct contact with the cylindrical mandrel surface.

HUB FOR FANS, WHEELS AND THE LIKE

This is a continuation of application Ser. No. 477,088 filed Mar. 21, 1983, now abandoned.

BACKGROUND OF THE INVENTION

The present invention refers to hubs for fans, wheels or the like, mainly consisting of a cast compound such as plastics, and a method for manufacturing such hubs.

Fans, wheels and similar devices are usually fitted to a steel shaft. The fitting on the shaft can be realized in different manners, but there is always a hub incorporating a bore through which the shaft is arranged. The hub may be fitted by means of screws, clamped by means of force fit or in other ways and it can be prevented from revolving by means of key in key groove. An indispensible condition at such a joint is that the connection shall not be weakened and break, even if the ambient temperature varies. Big temperature variations can occur particularly at fans depending upon the medium temporarily propelled by the fan. If hub and shaft are made from the same material, the temperature variations will not cause any essential problems, but if the two components are made from different materials having different thermal expansivity, then the grip of the hub about the shaft can vary.

Shafts are generally made from steel, whereas e.g. fans or their hubs are made from some sort of case or compression moulding compound. These materials, especially aluminum or plastic compound, have a much bigger thermal expansivity than steel. As to the plastics, these have, when subjected to load, a highly pronounced "creeping effect", which after a short time reduces the ability of the plastic to transfer forces and moments. It therefore has been necessary to take particular safety steps at fans with plastic hubs fitted to a steel shaft, in order to prevent these from coming loose, which can be fatal at high speeds. In order to give the hub sufficient strength it has also been necessary to produce it as a coarse lump. To make the hub as a coarse, heavily oversized lump however causes casting problems, higher manufacturing costs and provides no real solution on said problems of creeping effect and expansion due to temperature increase.

SUMMARY OF THE INVENTION

In order to remedy the above problems and to provide a hub with small material consumption and which is attached to a shaft with a firm grip independent of temperature variations and which at the same time is inexpensive and easy to manufacture it has according to the present invention been provided a hub mainly consisting of a cast compound such as plastics, and which is characterized thereby that a prestressed reinforcement coil preferably from steel is embedded adjacent the bore of the hub somewhat inside the surface thereof, whereby the different windings of the coil are somewhat spaced apart to allow each winding to be completely embedded in cast compound, and that the coil is so strong, that it at temperature alterations urges the casting to follow the thermal dimensional changes of the coil.

The invention also includes a method for manufacturing the hubs in question, and that means that a coil preferably of steel is pushed onto a cylindrical casting mandrel, of desired calculated diameter, said coil having a somewhat smaller diameter than the mandrel, whereupon the mandrel with the coil fitted thereon is embedded in cast compound. For ascertaining that the coil shall be located inside the surface of the bore, the mandrel is provided with longitudinal ridges, which prevent the coil from direct contact with the cylindrical mandrel surface.

According to the invention as mentioned above it is essential that every winding of the coil is embedded by cast compound. In order to ascertain this the winding must be spaced apart to allow the compound to penetrate inbetween them. The windings have therefore been made wavy laterally, whereby the windings will be spaced apart and will only contact each other in certain positions.

DESCRIPTION OF THE DRAWINGS

The invention hereinafter will be further described with reference to the accompanying figures, of which FIG. 1 in section shows a hub with cylindrical bore.

DESCRIPTION OF THE PREFERRED EMBODIMENTS

Figure 1:
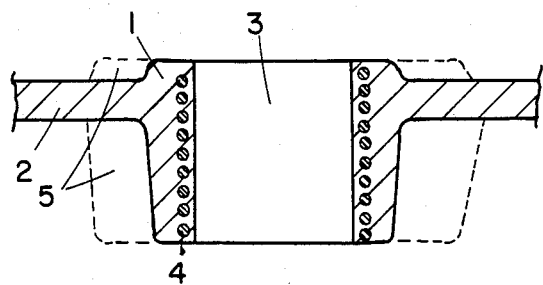

FIG. 1 shows a hub for an impeller. The hub consists of cast compound, e.g. plastics, which is present both in the cylindrical part 1 of the hub and in the fan blades 2. Adjacent the bore 3 of the hub there is embedded a coil 4 of steel. This coil lies at some distance, e.g. some tenths of a millimeter, from the surface of the bore, and the different windings of the coil 4 are embedded at some distance away from each other. It is in this connection essential that the plastic compound in the cylindrical part 1 is not given too big volume, as the essential advantage of the invention, lies in the fact that the steel coil 4 shall urge the plastic compound to follow itself in its thermal dimension variations. Simultaneously with the obtainment of this a material saving of no small economic value is obtained. In the figures the areas 5 have been drawn with dash lines in order to show the amount of material saved with a hub incorporating a steel coil according to the invention as compared to a similar hub without the steel coil.

Figure 2:
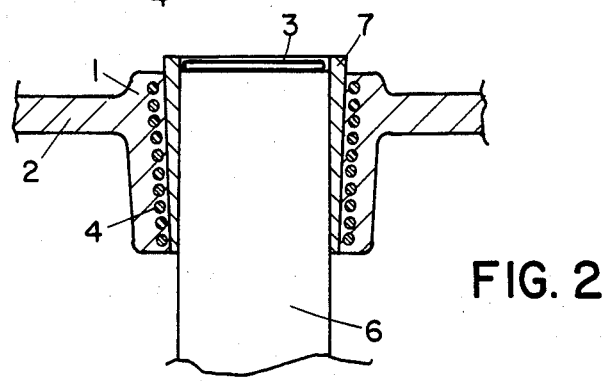
FIG. 2 shows in section a hub with tapering bore and fitted to a shaft by means of a fitting sleeve.

FIG. 2 shows a modification of the hub according to FIG. 1. The difference between these two embodiments is that the hub in FIG. 2 has been given a tapering internal surface. The hub has been fitted on a shaft 6 by means of a clamping sleeve 7. This clamping sleeve 7 can be of different designs but is preferably of the type described in Swedish patent No. 7900526-0.

Figure 3:
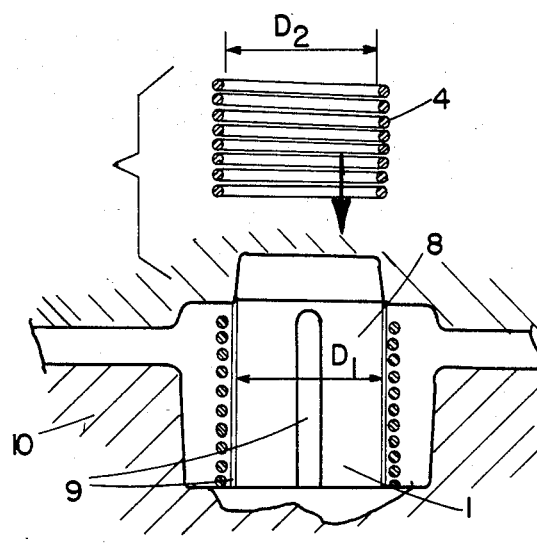
FIG. 3 shows the method for producing the hub according to the invention.

FIG. 3 shows schematically the manufacturing method for the hubs in question. On a mandrel 8 having a diameter $D_1$, which is fitted a steel coil 4 having a diameter $D_2$, which is somewhat smaller than the diameter $D_1$. The mandrel is equipped with spaced apart longitudinal ridges 9, which ridges locate the windings of the coil outside the cylindrical surface of the mandrel 8. When plastic is injected into the space formed by the mandrel 8 and the mould 10, all windings of the coil thereby will be individually embedded in plastic.

Figure 4:
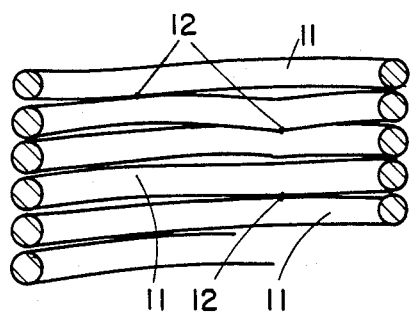
FIG. 4 shows a coil having waved windings.

FIG. 4 shows a portion of the coil 4. The windings as can be seen are made in wave-form 11. The waviness does not coincide between the windings and these therefore will contact each other at the positions 12 only. The cast compound therefore can penetrate easily between the windings. Due to the present invention it is obtained a hub, which is dimension stable in relation to the shaft on which it shall be fitted, if the coil and the shaft are made of the same material. It is also obtained a hub with reduced cast compound consumption and with high strength.

The invention is not limited to the embodiments shown but can be varied in different manners within the scope of the claims.

I claim:

1. A hub assembly for mounting fans, wheels and the like on a shaft member (6) comprising a hub portion made of a flexible resilient material, such as plastics, having a bore (3) for the shaft and a prestressed reinforcing coil (4), preferably of a material having similar expansion properties as that of shaft (6) embedded essentially completely within the hub portion adjacent the bore (3) of the hub somewhat inside the bore surface whereby the different windings of the coil are somewhat spaced apart, and wherein the coil is so strong that at temperature variations it urges the material to follow the thermal dimension variations of the coil, thereby maintaining a firm grip between the bore surface and the shaft (6).

2. A hub assembly as claimed in claim 1 wherein the windings of the reinforcing coil are of a predetermined wave form configuration to define spaced contact points between adjacent windings and openings between the contact points so that the plastic material fills the openings during a casting operation.

3. A hub assembly as claimed in claim 1 wherein the reinforcing coil (4) is made of steel.

4. A hub assembly as claimed in claim 1 wherein the inner diameter of the bore is smaller than the inner diameter of a cylindrical plane through the inner edges of said coil.

5. A hub assembly for mounting fans, wheels and the like, on a shaft member (6) comprising a hub portion made of a flexible resilient material, such as plastics, having a bore (3) for the shaft and a prestressed reinforcing coil (4), preferably of a material having similar expansion properties as that of shaft (6) embedded essentially completely within the hub portion adjacent the bore (3) of the hub somewhat inside the bore surface whereby the different windings of the coil are somewhat spaced apart, and wherein the coil is so strong that at temperature variations it urges the material to follow the thermal dimension variations of the coil, thereby maintaining a firm grip between the bore surface and the shaft (6), the inner bore of said hub being slightly tapered and a clamping sleeve having a complementary tapered bore surface engaging between the hub bore and the shaft to secure it in place by means of a clamping action.

* * * * *